United States Patent
Xu et al.

(10) Patent No.: US 11,431,632 B1
(45) Date of Patent: Aug. 30, 2022

(54) ID/LOCATION HYBRID FORWARDING METHOD BASED ON SOURCE ROUTING

(71) Applicant: Zhejiang Lab, Zhejiang (CN)

(72) Inventors: Qi Xu, Zhejiang (CN); Hanguang Luo, Zhejiang (CN); Tao Zou, Zhejiang (CN); Ruyun Zhang, Zhejiang (CN); Geyang Xiao, Zhejiang (CN); Wanxin Gao, Zhejiang (CN); Huifeng Zhang, Zhejiang (CN); Congqi Shen, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 0 days.

(21) Appl. No.: 17/739,173

(22) Filed: May 9, 2022

(30) Foreign Application Priority Data

Nov. 23, 2021 (CN) .......................... 202111393426.4

(51) Int. Cl.
*H04L 45/745* (2022.01)
*H04L 45/50* (2022.01)
*H04L 45/00* (2022.01)

(52) U.S. Cl.
CPC ............ *H04L 45/745* (2013.01); *H04L 45/20* (2013.01); *H04L 45/507* (2013.01)

(58) Field of Classification Search
CPC ..... H04L 45/745; H04L 45/20; H04L 45/507; H04L 45/50; H04L 45/34
See application file for complete search history.

(56) References Cited

U.S. PATENT DOCUMENTS

| 2015/0098468 A1* | 4/2015 | Kim ........................ H04L 45/04 370/390 |
| 2018/0062935 A1* | 3/2018 | Dong ....................... H04L 67/10 |

FOREIGN PATENT DOCUMENTS

| EP | 3846409 A1 * | 7/2021 | ........... H04L 12/185 |
| KR | 20180047961 A | * 10/2018 | |

* cited by examiner

Primary Examiner — Afshawn M Towfighi
(74) Attorney, Agent, or Firm — JCIPRNET

(57) ABSTRACT

The present invention relates to the technical field of computer networking, in particular to an ID/location hybrid forwarding method based on source routing, including a message format based on an extension header of a MobilityFirst protocol, a source routing forwarding mechanism based on ID identifiers and a source routing forwarding mechanism based on location identifiers. Through the method of the present invention, the source routing forwarding mechanism based on ID identifiers can be adopted in the access domains of the MobilityFirst network to realize the internetworking of intra-domain networks, and the source routing forwarding mechanism based on location identifiers in the core domain realizes the interconnection of inter-domain networks; the method greatly simplifies the processing flow of the data plane of the MobilityFirst network, and meanwhile reserves the design that the ID identifiers and the location identifiers are separated, thereby effectively supporting intra-domain and inter-domain mobile data forwarding.

5 Claims, 5 Drawing Sheets

| Node | ID Identifier | Location Identifier |
|---|---|---|
| 311 | 10.0.3.11 | 10.2.20.0 |
| 312 | 10.0.3.12 | 10.2.30.0 |
| 221 | 10.2.20.1 | 10.2.20.0 |
| 222 | 10.2.20.2 | 10.2.20.0 |
| 224 | 10.2.20.4 | 10.2.20.0 |
| 211 | 10.2.10.1 | 10.2.10.0 |
| 212 | 10.2.10.2 | 10.2.20.0 |
| 213 | 10.2.10.3 | 10.2.30.0 |
| 214 | 10.2.10.4 | 10.2.40.0 |
| 231 | 10.2.30.1 | 10.2.30.0 |
| 233 | 10.2.30.3 | 10.2.30.0 |
| 234 | 10.2.30.4 | 10.2.30.0 |
| 244 | 10.2.40.4 | 10.2.40.0 |
| 241 | 10.2.40.1 | 10.2.40.0 |
| 242 | 10.2.40.2 | 10.2.40.0 |

| Version | Service Identifier | Protocol |
|---------|-------------------|----------|
| Payload Offset | | Reserved |
| Payload Size | | |
| 10.0.3.11 | | |
| 10.2.20.0 | | |
| 10.0.3.12 | | |
| 10.2.30.0 | | |
| Extension Header Length | 0 | 2 | 0 |
| 10.2.20.2 | | |
| 10.2.20.1 | | |
| 10.2.20.4 | | |
| Payload | | |

FIG. 5

| Version | Service Identifier | Protocol |
|---------|-------------------|----------|
| Payload Offset | | Reserved |
| Payload Size | | |
| 10.0.3.11 | | |
| 10.2.20.0 | | |
| 10.0.3.12 | | |
| 10.2.30.0 | | |
| Extension Header Length | 0 | 2 | 1 |
| 10.2.20.0 | | |
| 10.2.10.0 | | |
| 10.2.30.0 | | |
| Payload | | |

FIG. 6

| Version | Service Identifier | Protocol |
|---|---|---|
| Payload Offset | | Reserved |
| Payload Size | | |
| 10.0.3.11 | | |
| 10.2.20.0 | | |
| 10.0.3.12 | | |
| 10.2.30.0 | | |
| Extension Header Length | 0 | 2 | 0 |
| 10.2.30.4 | | |
| 10.2.30.1 | | |
| 10.2.30.3 | | |
| Payload | | |

| Version | Service Identifier | Protocol |
|---|---|---|
| Payload Offset | | Reserved |
| Payload Size | | |
| 10.0.3.11 | | |
| 10.2.20.0 | | |
| 10.0.3.12 | | |
| 10.2.40.0 | | |
| Extension Header Length | 0 | 2 | 1 |
| 10.2.20.0 | | |
| 10.2.10.0 | | |
| 10.2.40.0 | | |
| Payload | | |

FIG. 9

| Version | Service Identifier | Protocol |
|---|---|---|
| Payload Offset | | Reserved |
| Payload Size | | |
| 10.0.3.11 | | |
| 10.2.20.0 | | |
| 10.0.3.12 | | |
| 10.2.40.0 | | |
| Extension Header Length | 0 | 2 | 0 |
| 10.2.40.4 | | |
| 10.2.40.1 | | |
| 10.2.40.2 | | |
| Payload | | |

FIG. 10

ID/LOCATION HYBRID FORWARDING METHOD BASED ON SOURCE ROUTING

CROSS-REFERENCE TO RELATED APPLICATION

This application claims the priority benefit of China application serial no. 202111393426.4, filed on Nov. 23, 2021. The entirety of the above-mentioned patent application is hereby incorporated by reference herein and made a part of this specification.

BACKGROUND

Technical Field

The present invention relates to the technical field of computer networking, in particular to an ID/location hybrid forwarding method based on source routing.

Description of Related Art

MobilityFirst network as a brand-new network architecture centered on mobility is designed for an objective of realizing mobility support and reliability assurance in the network, so as to solve the problem of poor mobility of the existing IP network architecture in mobile scenarios. The core design idea of the MobilityFirst network is to completely separate an ID identifier of each node in the network from a location identifier representing a network address. Each device and content in the network is assigned a globally unique ID identifier, and meanwhile these devices and contents in the network will be mapped to corresponding location identifiers to determine their network domain locations. The ID identifier of each device or content in the network will not change in any case, while its location identifier will change as it moves. In this way, the MobilityFirst network can determine the location of the device in the process of moving and support the mobility of hosts and network. However, MobilityFirst network only realizes a generalized storage-aware routing protocol (GSTAR) and is applicable for local area networks with a small number of nodes, with a complicated forwarding process and failure to support mobility across network domains. When the scale of the MobilityFirst network is expanded, it needs to consider the existence of an inter-domain core network domain to interconnect local area networks of different levels. Therefore, it is necessary to design a perfect intra-domain/inter-domain route forwarding method, which can support uninterrupted data transmission when a mobile terminal user is moved and switched within a network domain and can also support mobility between network domains.

Compared with traditional routing protocols, source routing greatly simplifies the complexity of a data plane. One of the features of the source routing is that control nodes master global network information (including node status information, link status information, etc.), a source forwarding node records and saves the forwarding entries from the control nodes, performs routing and addressing for data messages, and adds a forwarding label stack, and an intermediate forwarding node only needs to perform forwarding according to the forwarding label stack carried by the data message.

SUMMARY

In order to solve the problems existing in the prior art that the current MobilityFirst network cannot effectively support inter-domain mobility and the forwarding process is complicated, the present invention proposes an ID/location hybrid forwarding method based on source routing. The method has the following specific technical solutions:

an ID/location hybrid forwarding method based on source routing applied for a MobilityFirst network is customized based on an extension header of a MobilityFirst network protocol, the extension header includes an extension header head and several label stacks, and the extension header head includes a 1-byte-long extension header length field, a 1-byte-long next label offset, a 1-byte-long last hop label offset and a 1-byte-long forwarding mechanism identifier bit;

the extension header length field represents a total length of the extension header head and the label stacks, and segment identifiers of the label stacks are distributed in an order of label stack [0]-label stack [n] in the extension header of the MobilityFirst protocol, wherein the label stack [0] represents a stack top label of the label stacks, and n is an integer greater than or equal to 0;

the next label offset points to a next hop forwarding node in the label stacks;

the last hop label offset always points to a stack bottom of the label stacks to judge whether the last hop is reached; and the forwarding mechanism identifier bit is configured to indicate whether the current forwarding mechanism is forwarding based on ID identifiers or location identifiers, and meanwhile it also indicates whether the ID identifiers or the location identifiers are filled in the label stacks of the extension header.

Further, when the forwarding mechanism identifier bit is 0, ID identifiers are filled in the label stacks, and network nodes forward a data message according to a source routing mechanism based on the ID identifiers; and when the forwarding mechanism identifier bit is 1, location identifiers are filled in the label stacks, and the network nodes forward the data message according to a source routing mechanism based on the location identifiers.

Further, the step of forwarding the data message by the source routing mechanism based on the ID identifiers is specifically as follows:

in an access domain of the MobilityFirst network, an intra-domain forwarding path label stack for forwarding a data message is calculated by a control node of the access domain, a shortest forwarding path from a source ID identifier node to a target ID identifier node is calculated according to a shortest path algorithm, and the ID identifiers of switching nodes along the path are filled in the label stack in order;

access nodes in the access domain receive a data message from a mobile terminal/edge node of a core domain, wherein the data message is in a format based on a MobilityFirst protocol and does not carry an extension header;

the access nodes identify the ID identifier label stack associated with the target ID identifier of the data message, wherein the ID identifier label stack specifies the order of the intra-domain switching nodes of the intra-domain forwarding path leading to the target ID identifier;

an extension header is added to the data message by the access nodes, and the ID identifier label stack is filled in the extension header; and according to the ID identifier label stack, the data message is forwarded to a next switching node of the intra-domain forwarding path until the data message is forwarded to a last switching node in the label stack.

Further, if the last switching node is directly connected to the target ID identifier node, the data message is forwarded to the target ID identifier node, and the extension header of the data message is deleted at the same time; and if the last switching node is not connected to the target ID identifier node, the data message is forwarded to the edge node of the core domain.

Further, the step of forwarding the data message by the source routing mechanism based on the location identifiers is specifically as follows:

in the core domain of the MF network, an inter-domain forwarding path label stack for forwarding a data message is calculated by a control node of the access domain, a shortest forwarding path from a source location identifier node to a target location identifier node is calculated according to the shortest path algorithm, and the location identifiers of routing nodes along the path are filled in the label stack in order;

the edge nodes in the domain receive a data message from domains, and the data message is in a format based on the MobilityFirst protocol and carries an extension header;

the edge node identifies the location identifier label stack associated with the target location identifier of the data message, wherein the ID identifier label stack specifies the order of the intra-domain switching nodes of the intra-domain forwarding path leading to the target ID identifier;

the ID identifier label stack is deleted from the extension header of the data message by the edge node, the ID identifier label stack is filled in the extension header, and meanwhile the extension header head is updated;

according to the location identifier label stack, the data message is forwarded to a next routing node of the inter-domain forwarding path until the data message is forwarded to a last routing node in the label stack; and the last routing node forwards the data message to an access node of the network domain of the target location identifier, and the extension header of the data message is deleted at the same time.

The present invention has the advantages that:

The design of label stacks based on source routing of the present invention greatly simplifies the processing flow of the data plane of the MobilityFirst network, and meanwhile it ensures that the access domain guides the forwarding using the ID identifier and the core domain guides the forwarding using the location identifier, thereby effectively supporting intra-domain and inter-domain mobile data forwarding.

BRIEF DESCRIPTION OF THE DRAWINGS

FIG. 5 shows the source routing based on ID identifiers in the access domain 220 in an embodiment of the present invention;

FIG. 6 shows the source routing based on location identifiers in the core domain 210 in an embodiment of the present invention;

FIG. 9 shows the source routing based on location identifiers in the core domain 210 after inter-domain mobile switching in an embodiment of the present invention;

FIG. 10 shows the source routing based on ID identifiers in the access domain 240 after inter-domain mobile switching in an embodiment of the present invention.

DESCRIPTION OF THE EMBODIMENTS

To make the objective, technical solutions and technical effects of the present invention more clearly, the present invention will be further explained in detail below in combination with the accompanying drawings and embodiments of the specification.

Figures 1, 2:
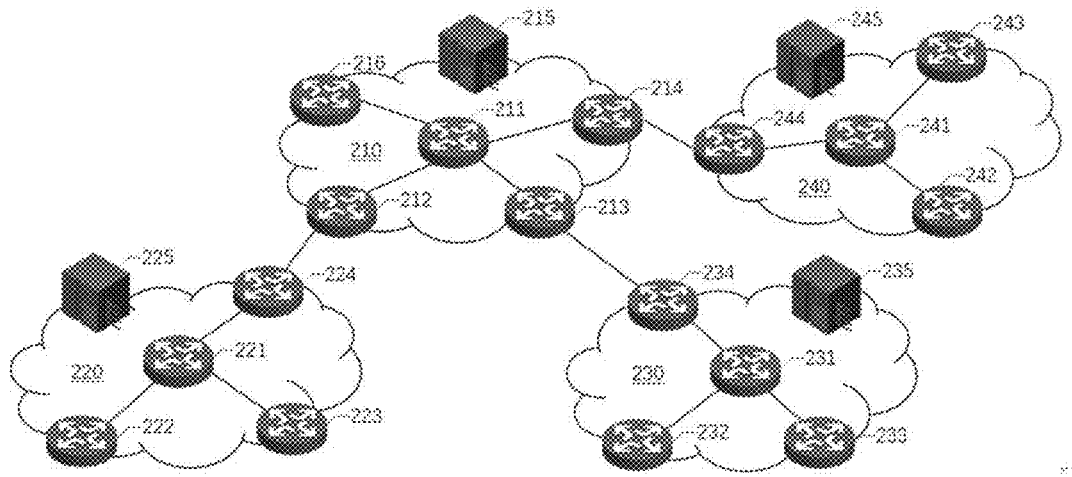
FIG. 1 is a schematic diagram of a message format of an extension header based on a MobilityFirst protocol provided by an embodiment of the present invention.
FIG. 2 is a schematic diagram of a large-scale MobilityFirst multi-domain network of an embodiment of the present invention.

An ID/location hybrid forwarding method based on source routing of the present invention is customized based on an extension header of a MobilityFirst network protocol, the extension header includes an extension header head and several label stacks, specifically, as shown in FIG. 1, and the extension header head with a total of 4 bytes includes a 1-byte-long extension header length field, a 1-byte-long next label offset, a 1-byte-long last hop label offset and a 1-byte-long forwarding mechanism identifier bit.

Wherein the extension header length field represents a total length of the extension header head and the label stacks, and segment identifiers of the label stacks are distributed in an order of label stack [0]-label stack [n] in the extension header of the MobilityFirst protocol, wherein the label stack [0] represents a stack top label of the label stacks, and n is an integer greater than or equal to 0;

the next label offset points to a next hop forwarding node in the label stacks, for example, the current forwarding node is a label stack [1], and then the next label offset points to a label stack [2];

the last hop label offset always points to a stack bottom of the label stacks to judge whether the last hop is reached; and the forwarding mechanism identifier bit is configured to indicate whether the current forwarding mechanism is forwarding based on ID identifiers or location identifiers, and meanwhile it also indicates whether the ID identifiers or the location identifiers are filled in the label stacks of the extension header; specifically, when the forwarding mechanism identifier bit is 0, ID identifiers are filled in the label stacks, and network nodes forwards a data message according to a source routing mechanism based on the ID identifiers; and when the forwarding mechanism identifier bit is 1, location identifiers are filled in the label stacks identifier, and the network nodes forward the data message according to a source routing mechanism based on the location identifier.

FIG. 2 shows a large-scale multi-domain network based on MobilityFirst in an embodiment of the present invention. The network includes one core domain 210, multiple access domains 220, 230, 240, multiple access control nodes 225, 235, 245, and one core control node 215. The access domains include multiple access nodes 222, 223, 224, 232, 233, 234, 242, 243, 244 and switching nodes 221, 231, 241, and the core domain 210 includes multiple edge nodes 212, 213, 214, 216 and a routing node 211.

The access nodes 222, 223, 224, 232, 233, 234, 242, 243, 244 and the switching nodes 221, 231, 241 are configured to perform source routing forwarding based on an ID identifier in their respective access domains 220, 230, 240; access control nodes 225, 235, 245 can know the network topology information of their respective access domains, including node information and link information, and can calculate a forwarding path between any pair of source node and target node and send flows to the access nodes in the form of a source routing label stack.

The edge nodes 212, 213, 214, 216 and the routing node 211 are configured to perform source routing forwarding based on a location identification in the core domain 210; and the core control node 215 can know the network topology information of the core domain, including node information and link information, and it can calculate a forwarding path between any pair of source node and target node and send flows to the access nodes in the form of a source routing label stack.

Figures 3, 4:
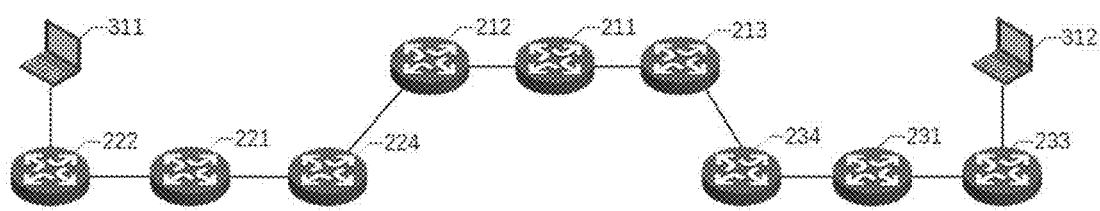
FIG. 3 shows ID identifiers and location identifiers of network nodes provided by an embodiment of the present invention.
FIG. 4 is a schematic diagram of an inter-domain source routing path passing through a core domain in an embodiment of the present invention.

FIG. 3 shows ID identifiers and location identifiers of the network nodes provided by an embodiment of the present invention; the ID identifier can be either a 32-bit IPv4 address or other identifiers that can uniquely represent an ID. The location identifier can be either a network segment of an autonomous domain to which a node belongs, or other identifiers that indicate a network location. Among them, although the edge nodes 212, 213, 214 belong to the core domain, the core domain is actually a collection of edge gateway nodes of each of the access domains. The edge nodes are bridges between the access domains and the core domain, as well as the entrances to the respective access domains. Therefore, the network location of an access domain connected to an edge node is used as the location identifier of the edge node.

FIG. 4 shows a schematic diagram of an embodiment of an inter-domain source routing path passing through the core domain. A first mobile terminal 311 can pass through the core domain from the source node which is the access node 222 in the access domain 220 to reach the target node which is the access node 233 in the access domain 230 to finally interconnect with a second mobile terminal 312. The entire communication process includes three segments of source routing, which are the source routing based on ID identifiers in the access domain 220, the source routing based on location identifiers in the core domain 210, and the source routing based on ID identifiers in the access domain 230.

FIG. 5 shows the source routing based on ID identifiers in the access domain 220. In the access domain 220, the access control node 225 calculates the forwarding path according to the source ID identifier 10.0.3.11 and the target ID identifier 10.0.3.12. Since the target ID identifier is not in the local access domain, it needs to forward the message to the edge node for inter-domain forwarding, the forwarding path in the access domain 220 goes through the nodes 222, 221 and 224 in sequence, and the corresponding source routing based on ID identifiers is 10.0.20.2, 10.0.20.1 and 10.0.20.4. After the message is received, the access node 224 judges that the source routing label stack is the last hop, and meanwhile there is no forwarding entry to the target ID identifier 10.0.3.12, and judges that the target location identifier 10.0.30.0 needs to forward the message to the edge node 212 for inter-domain forwarding.

FIG. 6 shows the source routing based on location identifiers in the core domain 210. After the edge node 212 receives the message from the access node 224, the core control node 215 calculates a forwarding path according to the source location identifier 10.0.20.0 and the target location identifier 10.0.30.0, and it can be known that the edge node 213 can lead to the target location identifier 10.0.30.0, and thus the calculated forwarding path in the core domain is to go through the nodes 212, 211 and 213 in sequence, and the corresponding source routing based on the location identifiers is 10.0.20.0, 10.0.10.0, and 10.0.30.0. After receiving the message, the edge node 213 judges that the source route label stack is the last hop, and there is a forwarding entry to the target location identifier 10.0.30.0, that is, going to the access domain 230, and thus it continues to forward the message to the access node 234 for intra-domain forwarding.

Figures 7, 8:
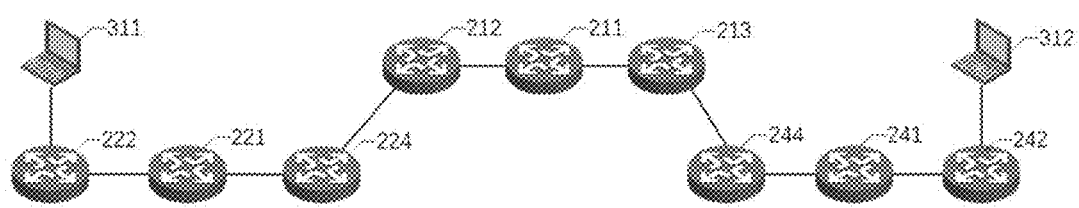
FIG. 7 shows the source routing based on ID identifiers in the access domain 230 in an embodiment of the present invention.
FIG. 8 shows a schematic diagram of a source routing path after an inter-domain mobility of a mobile terminal in an embodiment of the present invention.

FIG. 7 shows the source routing based on ID identifiers in the access domain 230. In the access domain 230, the core control node 235 calculates a forwarding path according to the source ID identifier 10.0.3.11 and the target ID identifier 10.0.3.12, the target ID identifier is stored in the local access domain, thus the forwarding path in the access domain 230 is to go through the nodes 234, 231 and 233 in sequence, and the corresponding source routing based on the ID identifiers is 10.0.30.4, 10.0.30.1 and 10.0.30.3. After the message is received, the access node 233 judges that the source routing label stack is the last hop, and meanwhile there is the information of direct connection to the target ID identifier 10.0.3.12, and thus the message can reach the target mobile terminal node 312.

FIG. 8 shows a schematic diagram of a source routing path after an inter-domain mobility of a mobile terminal. After the second mobile terminal is moved from the access domain 230 to the access domain 240, its ID identifier remains unchanged, the location identifier is updated from 10.2.30.0 to 10.2.40.0, and the forwarding path between the first mobile terminal and the second mobile terminal also needs updating, but the forwarding path in the access domain 220 is still calculated according to the source ID identifier 10.0.3.11 and the target ID identifier 10.0.3.12, it is just necessary to calculate the forwarding path in the core domain 210 according to the updated target identifier position 10.2.40.0, and the forwarding path in the access domain 240 is still calculated according to the source and target ID identifiers. It should be noted here that, the embodiment of the present invention assumes that the control node can sense a positional change of the mobile terminal in real time and inform the entire network of its information in time. However, a communication delay caused by updating the forwarding path before and after the inter-domain mobility switching mainly depends on the design of a mobility management mechanism, which is beyond the scope of the present invention.

FIG. 9 shows the source routing based on location identifiers in the core domain 210 after inter-domain mobility switching. After the second mobile terminal is moved to the access domain 240, its location identifier is updated from 10.2.30.0 to 10.2.40.0. Therefore, after the message from the first mobile terminal reaches the edge node 212, the core control node will calculate a forwarding path according to the source location identifier 10.0.20.0 and the target location identifier 10.0.40.0, and it can be known that the edge node 214 can go to the target location identifier 10.0.40.0, and thus the calculated forwarding path in the core domain is to go through the nodes 212, 211 and 214 in sequence, and the corresponding source routing based on the location identifiers is 10.0.20.0, 10.0.10.0, and 10.0.40.0. After receiving the message, the edge node 214 judges that the source routing label stack is the last hop, and there is a forwarding entry to the target location identifier 10.0.40.0, that is, going to the access domain 240, and thus it continues to forward the message to the access node 244 for inter-domain forwarding.

FIG. 10 shows the source routing based on ID identifiers in the access domain 240 after inter-domain mobility switching. In the access domain 240, the access control node 245 calculates a forwarding path according to the source ID identifier 10.0.3.11 and the target ID identifier 10.0.3.12, the target ID identifier exists in the local access domain, thus the forwarding path in the access domain 240 is to go through the nodes 244, 241 and 242 in sequence, and the corresponding source routing based on the ID identifiers is 10.0.40.4, 10.0.40.1 and 10.0.40.2. After receiving the message, the access node 242 judges that the source routing label stack is the last hop, and meanwhile there is the information of direct connection to the target ID identifier 10.0.3.12, and thus the message can still reach the target mobile terminal node 312.

Through the method of the present invention, the source routing forwarding mechanism based on ID identifiers can be adopted in the access domains of the MobilityFirst network to realize the internetworking of intra-domain networks, and the source routing forwarding mechanism based on location identifiers in the core domain realizes the interconnection of inter-domain networks; it greatly simplifies the processing flow of the data plane of the MobilityFirst network, and meanwhile it reserves the design that the ID identifiers and the location identifiers are separated, thereby effectively supporting intra-domain and inter-domain mobile data forwarding.

Those mentioned above are only preferred embodiments of the present invention, rather than limiting the present invention in any form. Although the implementation process of present application has been explained in detail in the preceding text, for those of good skills in the art, the technical solutions recorded in the above embodiments can be modified, or a part of the technical features could be equivalently alternated. Any modification or equivalent alternation within the spirit and principle of the present invention will fall into the protection scope of the present invention.

What is claimed is:

1. An ID/location hybrid forwarding method based on source routing, applied for a MobilityFirst network, wherein the method is customized based on an extension header of a MobilityFirst network protocol, the extension header comprises an extension header head and label stacks, and the extension header head includes a 1-byte-long extension header length field, a 1-byte-long next label offset, a 1-byte-long last hop label offset and a 1-byte-long forwarding mechanism identifier bit;

the extension header length field represents a total length of the extension header head and the label stacks, and segment identifiers of the label stacks are distributed in an order of label stack [0]-label stack [n] in the extension header of the MobilityFirst protocol, wherein the label stack [0] represents a stack top label of the label stacks, and n is an integer greater than or equal to 0;

the next label offset points to a next hop forwarding node in the label stacks;

the last hop label offset always points to a stack bottom of the label stacks to judge whether a last hop is reached; and the forwarding mechanism identifier bit is configured to indicate whether a current forwarding mechanism is forwarding based on ID identifiers or location identifiers, and also to indicate whether the ID identifiers or the location identifiers are filled in the label stacks of the extension header.

2. The ID/location hybrid forwarding method based on source routing of claim 1, wherein when the forwarding mechanism identifier bit is 0, the ID identifiers are filled in the label stacks, and network nodes forward a data message according to a source routing mechanism based on the ID identifiers; and when the forwarding mechanism identifier bit is 1, the location identifiers are filled in the label stacks, and the network nodes forward the data message according to a source routing mechanism based on the location identifiers.

3. The ID/location hybrid forwarding method based on source routing of claim 2, wherein the step of forwarding the data message by the source routing mechanism based on the ID identifiers is as follows:

in an access domain of the MobilityFirst network, a control node of the access domain calculates an intra-domain forwarding path label stack for forwarding the data message; a intra-domain forwarding path from a source ID identifier node to a target ID identifier node is calculated according to a shortest path algorithm, and the ID identifiers of switching nodes along the intra-domain forwarding path are filled in the intra-domain forwarding path label stack in order;

access nodes in the access domain receive the data message from an edge node of a core domain, and the data message is in a format based on the MobilityFirst protocol and does not carry the extension header;

the access nodes identify a ID identifier label stack associated with the target ID identifier of the data message, wherein the ID identifier label stack specifies an order of the switching nodes of the intra-domain forwarding path leading to the target ID identifier;

the access nodes add the extension header to the data message, and the ID identifier label stack is filled in the extension header; and according to the ID identifier label stack, the data message is forwarded to a next switching node of the intra-domain forwarding path until the data message is forwarded to a last switching node in the label stacks.

4. The ID/location hybrid forwarding method based on source routing of claim 3, wherein if the last switching node is directly connected to the target ID identifier node, the data message is forwarded to the target ID identifier node, and the extension header of the data message is deleted at the same time; and if the last switching node is not connected to the target ID identifier node, the data message is forwarded to the edge node of the core domain.

5. The ID/location hybrid forwarding method based on source routing of claim 2, wherein the step of forwarding the data message by the source routing mechanism based on the location identifiers is as follows:

in the core domain of the MobilityFirst network, a control node of an access domain calculates an inter-domain forwarding path label stack for forwarding the data message, an inter-domain forwarding path from a source location identifier node to a target location identifier node is calculated according to a shortest path algorithm, and the location identifiers of routing nodes along the inter-domain forwarding path are filled in the label stack in order;

an edge node in the access domain receives the data message from the access domain, and the data message is in a format based on the MobilityFirst protocol and carries the extension header;

the edge node identifies a location identifier label stack associated with the target location identifier of the data message, wherein the location identifier label stack specifies an order of the routing nodes of the intra-domain forwarding path leading to the target location identifier;

the edge node deletes the location identifier label stack in the extension header of the data message, the location identifier label stack is filled in the extension header, and the extension header head is updated;

according to the location identifier label stack, the data message is forwarded to a next routing node of the inter-domain forwarding path until the data message is forwarded to a last routing node in the label stacks; and the last routing node forwards the data message to an access node of a network domain of the target location identifier, and the extension header of the data message is deleted at the same time.

* * * * *